US012504269B2

(12) United States Patent
Byregowda Shivalingaiah et al.

(10) Patent No.: US 12,504,269 B2
(45) Date of Patent: Dec. 23, 2025

(54) SELF-ALIGNING INTERFEROMETRIC END POINT HOUSING

(71) Applicant: Applied Materials, Inc., Santa Clara, CA (US)

(72) Inventors: Trishul Byregowda Shivalingaiah, Bangalore (IN); Skanda Simha Chandrashekar, Bangalore (IN); Karthik Melinamane Prabhakar, Bengaluru (IN); Mahadev Joshi, Bangalore (IN); Peter F. Demonte, San Mateo, CA (US)

(73) Assignee: Applied Materials Inc., Santa Clara, CA (US)

( * ) Notice: Subject to any disclaimer, the term of this patent is extended or adjusted under 35 U.S.C. 154(b) by 267 days.

(21) Appl. No.: 18/378,543

(22) Filed: Oct. 10, 2023

(65) Prior Publication Data

US 2025/0116500 A1 Apr. 10, 2025

(51) Int. Cl.
*G01B 9/02* (2022.01)

(52) U.S. Cl.
CPC .................. *G01B 9/02049* (2013.01)

(58) Field of Classification Search
CPC ............ G01B 9/02049; G01B 9/02051; G01B 9/02052; H01L 21/67161
See application file for complete search history.

(56) References Cited

U.S. PATENT DOCUMENTS

| 5,319,960 A | 6/1994 | Gamble et al. |
| 6,406,924 B1 | 6/2002 | Grimbergen et al. |
| 6,905,624 B2 * | 6/2005 | Frum ................ H01J 37/32935 216/60 |
| 9,805,939 B2 | 10/2017 | Grimbergen |
| 10,365,212 B2 | 7/2019 | Kueny et al. |
| 2005/0006341 A1 | 1/2005 | Frum et al. |
| 2007/0023393 A1 | 2/2007 | Nguyen et al. |
| 2008/0261335 A1 | 10/2008 | Grimbergen |
| 2014/0118751 A1 | 5/2014 | Rajagopalan et al. |
| 2020/0124399 A1 * | 4/2020 | Lian ....................... G01B 11/06 |
| 2020/0393242 A1 | 12/2020 | Vishwanath et al. |
| 2021/0164915 A1 * | 6/2021 | Frankovich ........ G01B 9/02027 |

(Continued)

FOREIGN PATENT DOCUMENTS

KR 20080039251 A 5/2008

OTHER PUBLICATIONS

PCT International Search Report and Written Opinion for PCT/US2024/050514 dated Jan. 13, 2025.

*Primary Examiner* — Michael A Lyons
(74) *Attorney, Agent, or Firm* — Moser Taboada

(57) ABSTRACT

Embodiments of interferometric endpoint (IEP) housing assemblies for endpoint detection of plasma processing are provided herein. In some embodiments, IEP housing assemblies include: an IEP housing having an upper end configured to interface with a light source and having an internal cavity, wherein a lower end of the IEP housing is configured to interface with a dome assembly of a process chamber; a bracket having a body disposed about the IEP housing and having a plurality of arms extending radially outward from the body; and a plurality of biasing members extending from the body to the IEP housing and configured to hold the IEP housing within the body while allowing side-to-side deflection.

20 Claims, 5 Drawing Sheets

(56) References Cited

U.S. PATENT DOCUMENTS

2022/0148862 A1* 5/2022 Lian ................. H01J 37/32963
2022/0406635 A1* 12/2022 Myles ................. G01B 11/272
2024/0360560 A1* 10/2024 Mohanadass ..... H01J 37/32715

* cited by examiner

SELF-ALIGNING INTERFEROMETRIC END POINT HOUSING

FIELD

Embodiments of the present disclosure generally relate to substrate processing equipment.

BACKGROUND

Integrated circuits have evolved into complex devices that can include millions of components (e.g., transistors, capacitors, resistors, and the like) on a single chip. The evolution of chip designs requires faster circuitry and greater circuit density. The demands for greater circuit density necessitate a reduction in the dimensions of the integrated circuit components. The minimal dimensions of features of such devices are commonly referred to in the art as critical dimensions. The critical dimensions generally include the minimal widths of the features, such as lines, columns, openings, spaces between the lines, and the like.

As these critical dimensions shrink, accurate measurement and process control becomes more difficult. Interferometric endpoint detection methods use light beams (e.g., from an interferometric end point (IEP) housing) that are directed onto a substrate and the beams are reflected from the substrate to form reflected light beams. Based on the reflected beams, plasma processing endpoints, etch process endpoints, etch depth, or etch rate may be determined. However, interferometric end point housings in conventional process chambers are often assembled in a blinded position, creating difficulty in integration and alignment of the interferometric end point housing above the substrate during processing.

Accordingly, the inventors have provided herein embodiments of improved interferometric endpoint housing assemblies for endpoint detection.

SUMMARY

Embodiments of interferometric endpoint (IEP) housing assemblies for endpoint detection of plasma processing are provided herein. In some embodiments, IEP housing assemblies include: an IEP housing having an upper end configured to interface with a light source and having an internal cavity, wherein a lower end of the IEP housing is configured to interface with a dome assembly of a process chamber; a bracket having a body disposed about the IEP housing and having a plurality of arms extending radially outward from the body; and a plurality of biasing members extending from the body to the IEP housing and configured to hold the IEP housing within the body while allowing side-to-side deflection.

In some embodiments, an (IEP) housing assembly for endpoint detection of plasma processing includes: an IEP housing having an upper end configured to interface with a light source and having an internal cavity, wherein a lower end of the IEP housing is configured to interface with a dome assembly of a process chamber; a bracket having a body disposed about the IEP housing and having a plurality of arms extending radially outward from the body; a plurality of biasing members extending from the body to the IEP housing and configured to hold the IEP housing within the body while allowing side-to-side deflection; a first mounting plate coupled to the bracket via respective ends of the plurality of arms; and a plurality of second biasing members disposed between the plurality of arms and the first mounting plate and configured to exert a force on the bracket to hold the IEP housing against the dome assembly.

In some embodiments, a process chamber includes: a chamber body defining an interior volume therein; a dome assembly disposed in the interior volume, wherein the dome assembly includes a dome, a window, and a dome ring configured to clamp the window to the dome; and an upper assembly disposed above the dome, wherein the upper assembly includes: an interferometric endpoint (IEP) housing assembly for endpoint detection of plasma processing, comprising: an IEP housing having an upper end configured to interface with a light source and having an internal cavity, wherein a lower end of the IEP housing is configured to interface with the dome ring; a bracket having a body disposed about the IEP housing and having a plurality of arms extending radially outward from the body; and a plurality of biasing members extending from the body to the IEP housing and hold the IEP housing within the body while allowing side-to-side deflection to align the IEP housing with respect to the dome ring.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
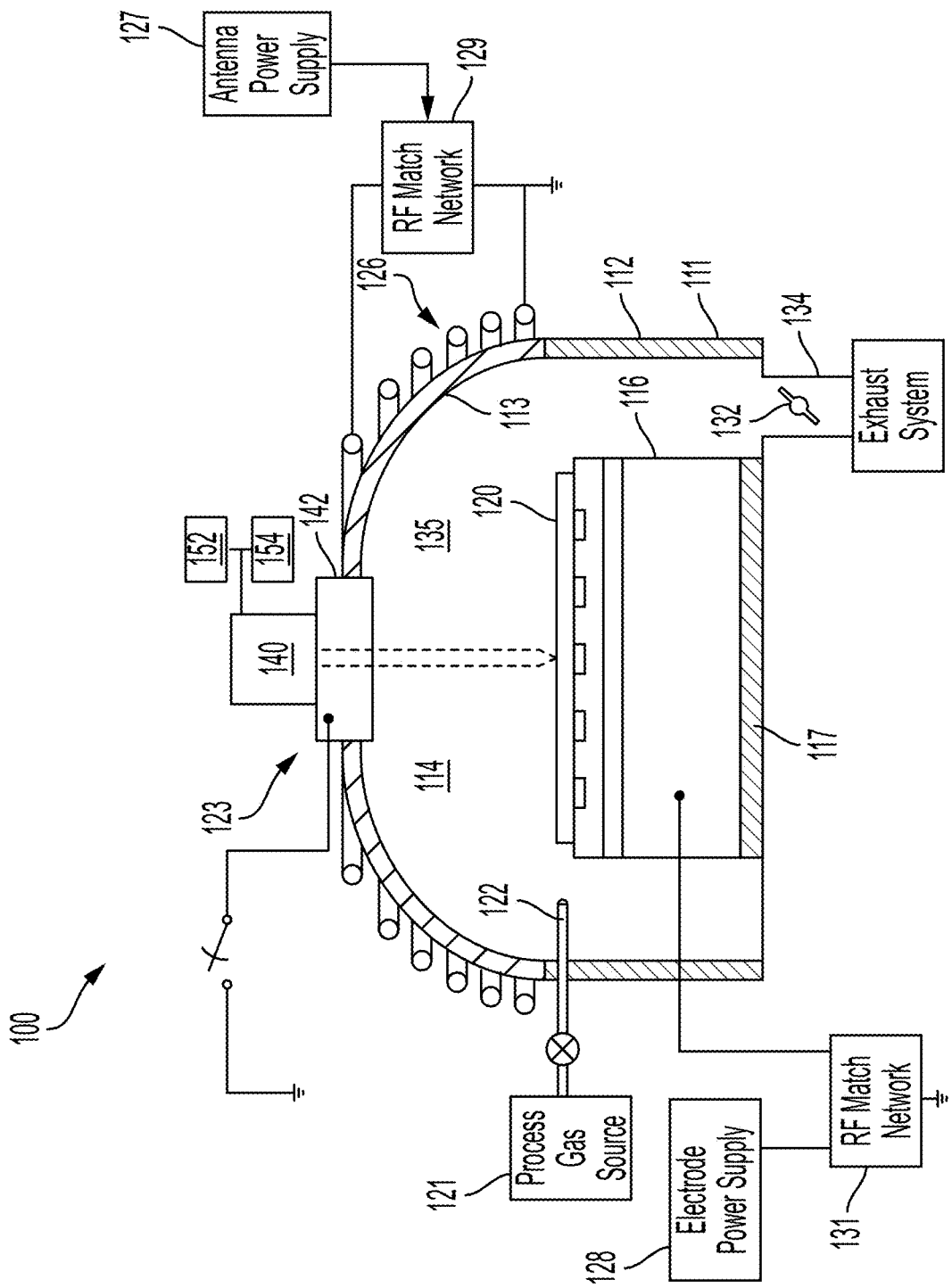
FIG. 1 depicts a schematic side view of a process chamber in accordance with at least some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of interferometric endpoint (IEP) housing assemblies for endpoint detection of plasma processing are provided herein. The IEP housing assemblies are coupled to an upper assembly of a process chamber, such as a plasma processing chamber, an etch chamber, or the like. The IEP housing assemblies generally include an IEP housing. The IEP housing may be difficult to align with a lower assembly of the process chamber having a dome assembly due to interference with other components of the process chamber. The IEP housing assemblies provided herein include a bracket, where self-aligning features disposed between the bracket and the IEP housing advantageously facilitate moving the IEP housing with respect to the bracket to self-align the IEP housing with respect to the dome assembly of the process chamber.

The IEP housing assemblies may advantageously provide alignment in one or more directions. For example, the IEP housing assemblies may include a plurality of biasing members configured to allow side-to-side deflection to provide alignment between the IEP housing and the dome assembly in a radial direction with respect to the IEP housing. The IEP housing assemblies may include a plurality of second biasing members to provide alignment between the IEP housing and the dome in an axial direction with respect to the IEP housing. The IEP housing assemblies may be biased towards or held against the dome assembly via the plurality of second biasing members.

FIG. 1 depicts a schematic side view of a process chamber 100 in accordance with at least some embodiments of the present disclosure. The process chamber 100 generally includes a cylindrical sidewall or chamber body 112 defining an interior volume 135 therein. The chamber body 112 includes a dome assembly 123 having a dome 113 and further includes a chamber bottom 117 mounted to sidewalls 111 of the chamber body 112. A flat lid (not shown) or other alternative lid capable of being used with an inductive coil may be used in place of the dome 113. An RF coil 126, or inductive coil, is disposed around at least a portion of the dome 113. The chamber body 112 can be made of a metal, such as anodized aluminum. The dome 113 can be made of an energy transparent material such as a ceramic or other dielectric material.

A substrate support 116 is disposed in the process chamber 100 to support a substrate 120 during processing. The substrate support 116 may be a conventional mechanical or electrostatic chuck with at least a portion of the substrate support 116 being electrically conductive and capable of serving as a process bias cathode. While not shown, a reticle adapter may be used to secure a reticle, or photomask, on the substrate support 116. The reticle adapter generally includes a lower portion milled to cover an upper portion of the substrate support 116 and a top portion having an opening that is sized and shaped to hold the reticle.

Processing gases are introduced into the process chamber 100 from a process gas source 121 through a gas distributor 122 peripherally disposed about the substrate support 116. Mass flow controllers (not shown) for each processing gas, or alternatively, for mixtures of the processing gas, are disposed between the process chamber 100 and the process gas source to regulate the respective flow rates of the process gases. The mass flow controllers can regulate a flow rate of up to about 500 sccm for a single process gas and up to about 300 sccm for a process gas mixture.

A plasma zone 114 is defined by the process chamber 100, the substrate support 116 and the dome 113. A plasma is formed in the plasma zone 114 from the processing gases using a coil power supply 127 to power the RF coil 126 to generate an electromagnetic field in the plasma zone 114. In some embodiments, the coil power supply 127 may be coupled to an RF match network 129. The substrate support 116 includes an electrode disposed therein, which is powered by an electrode power supply 128 and generates a capacitive electric field in the process chamber 100. In some embodiments, the electrode power supply 128 may be coupled to an RF match network 131. Typically, RF power is applied to the electrode in the substrate support 116 while the chamber body 112 is electrically grounded. The capacitive electric field is transverse to the plane of the substrate support 116 and influences the directionality of charged species to provide more vertically oriented anisotropic plasma processing of the substrate 120.

Process gases and etchant byproducts are exhausted from the process chamber 100 through an exhaust system 130. The exhaust system 130 may be disposed in the chamber bottom 117 of the process chamber 100 or may be disposed in the chamber body 112 of the process chamber 100 for removal of processing gases. A throttle valve 132 is provided in an exhaust port 134 for controlling the pressure in the process chamber 100.

The process chamber 100 includes an interferometric endpoint (IEP) housing assembly 140 disposed above the dome 113 to determine an endpoint of a process performed in the chamber body 112. Generally, the IEP housing assembly 140 is coupled to a light source 152 adapted to emit an incident light beam, and a light detector 154 that measures the intensity of the reflected light beam from the substrate 120 to generate a reflected intensity signal to determine process parameters. The light source 152 may comprise a suitable light source such as a monochromatic or polychromatic light source that generates an incident light beam having an intensity sufficiently high to provide a reflected light beam that is reflected from the substrate 110 with a measurable intensity. The light source 152 may deliver the incident light beam to the IEP housing assembly 140 via a suitable conduit, such as a fiber optic cable. The incident and reflected light beams are directed through a window 142 in the dome 113 that allows the light beams to pass in and out of the plasma zone 114. The window 142 is made of a suitable material, for example, sapphire, quartz, or the like.

In some embodiments, a controller 144 is coupled to the IEP housing assembly 140, for example, to count a number of interference fringes in the reflected light beam signal. The controller 144 may additionally or alternatively compare portions of the real-time measured reflection signal waveform to a stored characteristic waveform, or other representative pattern, and adjust process conditions in the process chamber 100 when the two waveforms have substantially the same shape.

The light detector 154 may comprise a light sensitive electronic component, such as a photomultiplier, photovoltaic cell, photodiode, or phototransistor, which provides an electrical signal in response to a measured intensity of the reflected light beam that is reflected from the substrate 120. A signal filter (not shown) can be plated in front of the light detector 154. The signal can be in the form of a change in the level of a current passing through an electrical component or a change in a voltage applied across an electrical component. The reflected light beam undergoes constructive and/or destructive interference which increases or decreases the intensity of the light beam, and the light detector 154 provides an electrical output signal in relation to the measured intensity of the reflected light beam. The electrical signal generated by the light detector 154 may be passed to the controller 144 for evaluation.

Figure 2:
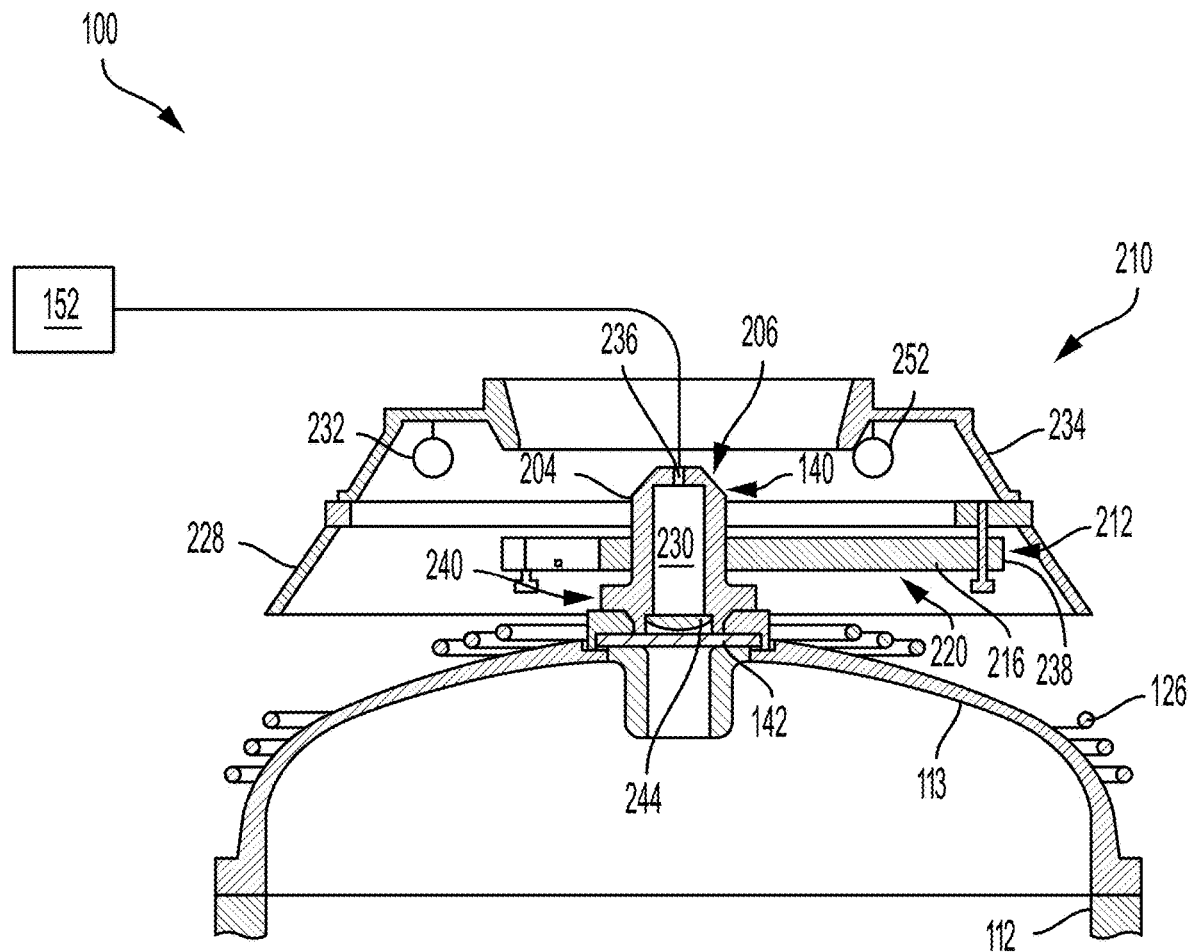
FIG. 2 depicts a schematic side view of an upper assembly of a process chamber in accordance with at least some embodiments of the present disclosure.
Figure 3:
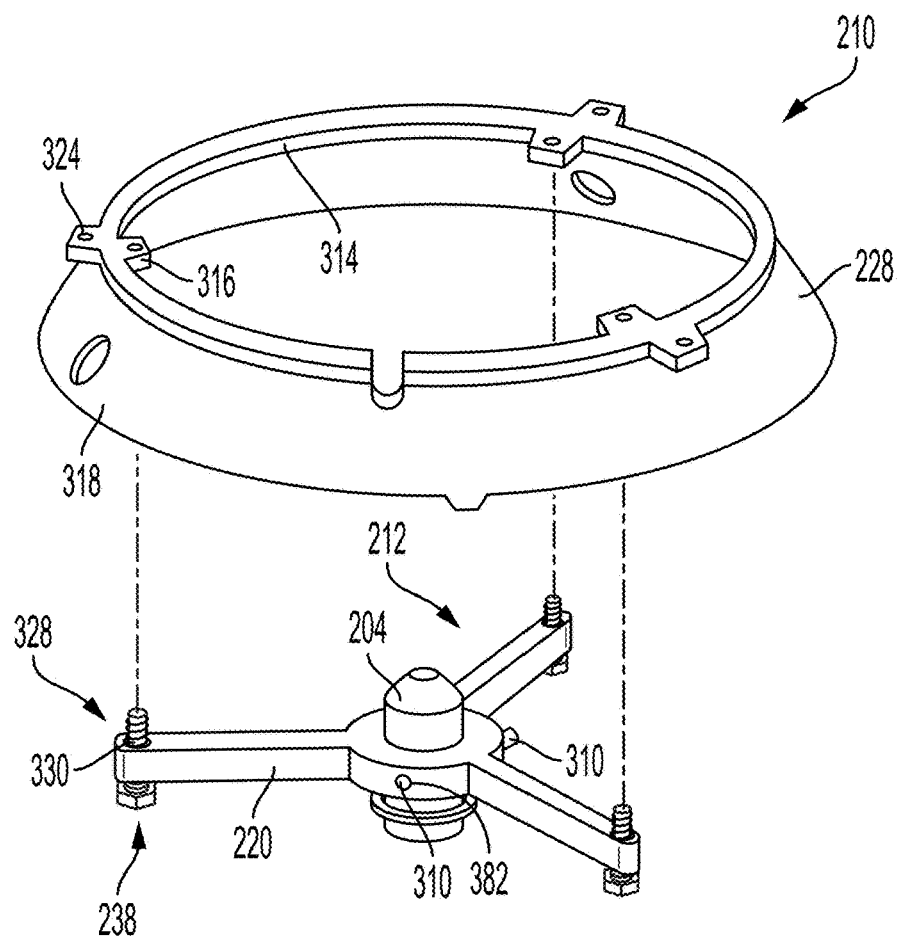
FIG. 3 depicts an expanded isometric view of an interferometric endpoint (IEP) housing assembly in accordance with at least some embodiments of the present disclosure.

FIG. 2 depicts a schematic side view of an upper assembly 210 of a process chamber 100 in accordance with at least some embodiments of the present disclosure. FIG. 3 depicts an expanded isometric view of an IEP housing assembly 140 in accordance with at least some embodiments of the present disclosure. The upper assembly 210 includes the IEP housing assembly 140. In some embodiments, the upper assembly 210 is disposed above the dome 113 and is vertically movable with respect to the dome 113. The IEP housing assembly 140 generally comprises an IEP housing 204 having an upper end 206 configured to interface with the light source 152 and having an internal cavity 230. A bracket 212 having a body 216 is disposed about the IEP housing 204 and includes a plurality of arms 220 extending radially outward from the body 216. In some embodiments, the body 216 is annular in shape. In some embodiments, as depicted in FIG. 3, the plurality of arms 220 consists of three arms. In some embodiments, the upper end 206 of the IEP housing 204 includes a central opening 236 and a lower end 240 of the IEP housing 204 includes a second central opening concentric with the central opening 236. In some embodiments, the bracket 212 and the IEP housing 204 are made of plastic.

In some embodiments, the body 216 includes a plurality of clearance holes 382. In some embodiments, a plurality of screws 310 extend through the plurality of clearance holes 382 to loosely hold the IEP housing within a central opening of the body. In some embodiments, a plurality of biasing members 410 (discussed in more detail below with respect to FIG. 4) extend from the body 216 to the IEP housing 204 to exert a biasing force on the IEP housing 204 to hold the IEP housing 204 within the bracket 212. The plurality of biasing members 410 advantageously hold the IEP housing 204 while allowing for side-to-side deflection, or side-to-side play with respect to the bracket 212 to self-align the IEP housing 204 with respect to the dome 113 in a radial direction.

In some embodiments, the upper assembly 210 includes a first mounting plate 228 is coupled to the bracket 212 via respective ends 238 of the plurality of arms 220. In some embodiments, the first mounting plate 228 comprises a ring shaped body that includes an upper ring 314 and a lower ring 318 extending downward and radially outward from the upper ring 314. In some embodiments, a plurality of mounting tabs 316 extend radially inward from the upper ring 314 and are configured for coupling the first mounting plate 228 to the bracket 212.

In some embodiments, the upper assembly 210 further comprises a lamp assembly 232 having a plurality of lamps 252 and coupled to the IEP housing assembly 140. In some embodiments, a second mounting plate 234 is coupled to the first mounting plate 228 and configured for mounting the plurality of lamps 252. In some embodiments, the plurality of lamps 252 are disposed within the second mounting plate 234. In some embodiments, the first mounting plate 228 includes a plurality of second mounting tabs 324 extending radially outward from the upper ring 314 and configured for coupling the first mounting plate 228 to the second mounting plate 234. In some embodiments, the RF coil 126 (discussed in more detail below) is disposed between the bracket 212 and the dome 113 when installed in the process chamber 100. In some embodiments, the RF coil 126 is disposed about the IEP housing 204 such that the IEP housing 204 is within, or radially inward of, the RF coil 126.

In some embodiments, a plurality of second biasing members 328 are disposed between the plurality of arms 220 and the first mounting plate 228 and configured to exert a force on the bracket 212 to push the bracket 212 towards the dome 113, which in turn forces the IEP housing 204 towards the dome 113 to facilitate aligning the IEP housing 204 with the dome 113. Examples of the plurality of second biasing members 328 may be springs, or the like. In some embodiments, each of the plurality of second biasing members 328 are disposed about a fastener 330 extending through a corresponding one of the plurality of arms 220 and into the first mounting plate 228. In some embodiments, the fastener 330 is a shoulder screw.

In some embodiments, a lens 244 is disposed in the lower end 240 of the IEP housing 204. The lens 244 may be any suitable lens for focusing incident light from the light source 152 onto the substrate 120. In some embodiments, the lens 244 is a convex lens. The size or area of a beam from the light source 152 may be sufficiently large to compensate for variations in surface topography of the substrate 120 to enable etching of high aspect ratio features having small openings, such as vias or deep and narrow trenches. The window 142 is aligned with the lens 244 so that a light beam from the light source 152 may pass through the lens 244 and the window 142.

Figure 4:
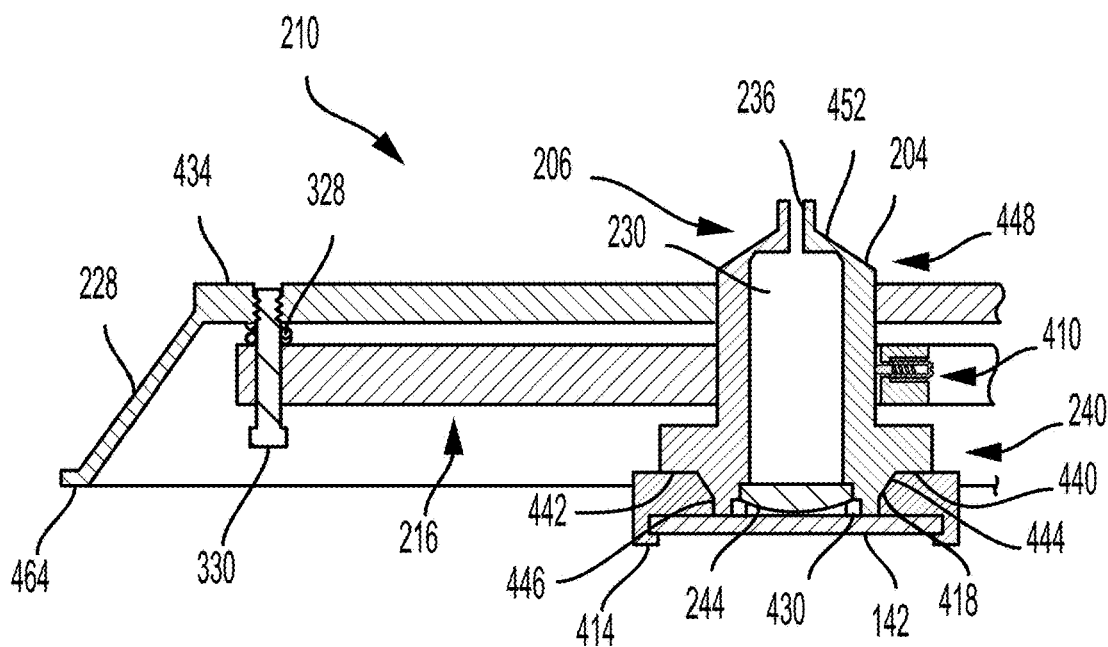
FIG. 4 depicts a cross-sectional side view of a portion of an interferometric endpoint (IEP) housing assembly in accordance with at least some embodiments of the present disclosure.

FIG. 4 depicts a cross-sectional side view of a portion of an interferometric endpoint (IEP) housing assembly in accordance with at least some embodiments of the present disclosure. In some embodiments, the window 142 is clamped to the dome 113 via a dome ring 414. When the upper assembly 210 is in a lower position, a lower end 240 of the IEP housing 204 extends into the dome ring 414. The lower end 240 is generally configured to interface with the dome assembly 123 by, for example accommodating the dome ring 414. For example, in some embodiments, the dome ring 414 includes an angled surface 418 to advantageously facilitate self-alignment between the dome ring 414 and the IEP housing 204 when the upper assembly 210 is lowered onto the dome assembly 123 during installation. In some embodiments, the angled surface 418 extends upward and radially outward.

In some embodiments, the IEP housing 204 includes an annular notch 440 at the lower end 240. In some embodiments, the annular notch 440 is at least partially defined by an angled surface 444 that corresponds with the angled surface 418 of the dome ring 414. In some embodiments, the angled surface 418 extends downward and radially inward. In some embodiments, the annular notch 440 is defined by a first edge 442 that is substantially horizontal, a second edge 446 that is substantially vertical, and the angled surface 433 extending from the first edge 442 to the second edge 446. In some embodiments, the IEP housing 204 includes an upper annular notch 448 at the upper end 206. In some embodiments, the upper annular notch 448 includes an angled surface 452. In some embodiments, the angled surface 452 is disposed radially inward of the annular notch 440 at the lower end 240.

In some embodiments, a retaining ring 430 is coupled to the IEP housing 204 at the lower end 240 to clamp the lens 244 therebetween. The retaining ring 430 may be coupled to the IEP housing 204 via a threaded interface therebetween. The first mounting plate 228 is coupled to the bracket 212 via respective ends of the plurality of arms 220. In some embodiments, the bracket 212 is entirely disposed between an upper surface 434 of the first mounting plate 228 and a lower surface 464 of the first mounting plate 228.

Figure 5:
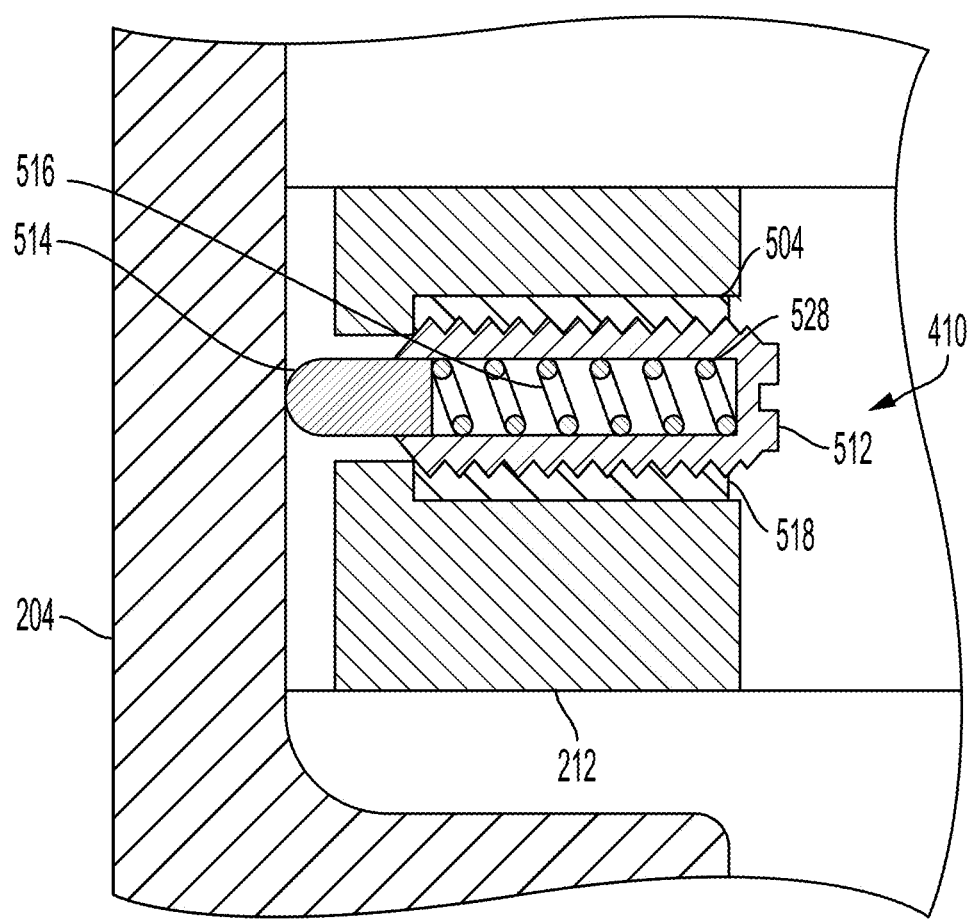
FIG. 5 depicts a cross-sectional side view of an interface between a biasing member of a bracket and an interferometric endpoint (IEP) housing in accordance with at least some embodiments of the present disclosure.

FIG. 5 depicts a cross-sectional side view of an interface between a biasing member of the plurality of biasing members 410 of the bracket 212 and the IEP housing 204 in accordance with at least some embodiments of the present disclosure. The plurality of biasing members 410 may be disposed in openings 504 of the bracket 212. In some embodiments, each of the plurality of biasing members 410 include a housing 512, a pin 514, and a spring 516. The housing 512 is generally fixed within the openings 504. For example, each of the openings 504 may include a threaded insert 518 fixed therein. The housing 512 may include a threaded outer surface that engages with internal threads of the threaded insert 518.

The pin 514 is movably disposed within an opening 528 in the housing 512. The spring 516 may be disposed in the opening 528 and configured to urge the pin 514 out of the openings 528. When disposed proximate the IEP housing 204, the spring 516 may push the pin 514 to an outer surface of the IEP housing 204, thereby advantageously facilitating self-aligning the bracket 212 to the IEP housing 204.

Figure 6:
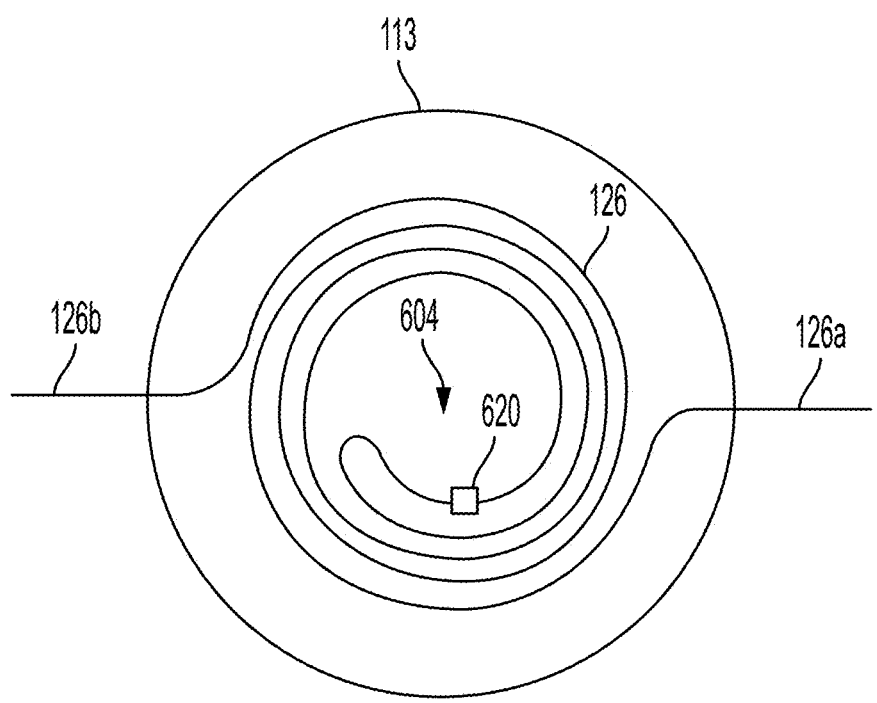
FIG. 6 depicts a simplified top view of an RF coil in accordance with at least some embodiments of the present disclosure.

FIG. 6 depicts a simplified top view of an RF coil 126 in accordance with at least some embodiments of the present disclosure. In some embodiments, the RF coil 126 is disposed about a central region 604 without passing through the central region 604, where the central region 604 is sized to prevent interference between the RF coil 126 and the IEP housing assembly 140. As such, the RF coil 126 does not extend through a center of the dome 113. In some embodiments, the RF coil 126 may comprise a split type coil assembly having a plurality of coils, for example, a first coil 126a and a second coil 126b. The split type coil assembly includes two or more coils that are arranged about the center of the dome in loop patterns conformal to the shape of the dome 113 without passing through the central region 604. The split type coil assembly may improve blanket critical dimension and process uniformity across a substrate being processed. The split type coil assembly according to the present disclosure also reduces power loss to energetic charged particles and induced negative impacts to devices and process chamber hardware due to undesired capacitive coupling, therefore, improving power efficiency and hardware reliability.

In some embodiments, the first coil 126a and the second coil 126b are connected at a common point 620 near the central region 604. The first coil 126a and the second coil 126b are connected to the coil power supply 127 via the common point 620. In some embodiments, a length of the first coil 126a and a length of the second coil 126b are substantially the same, for example, within about 5% or less. In some embodiments, the RF coil 126 is arranged in a non-symmetrical manner.

While the foregoing is directed to embodiments of the present disclosure, other and further embodiments of the disclosure may be devised without departing from the basic scope thereof.

The invention claimed is:

1. An interferometric endpoint (IEP) housing assembly for endpoint detection of plasma processing, comprising:
    an IEP housing having an upper end configured to interface with a light source and having an internal cavity, wherein a lower end of the IEP housing is configured to interface with a dome assembly of a process chamber;
    a bracket having a body disposed about the IEP housing and having a plurality of arms extending radially outward from the body; and
    a plurality of biasing members extending from the body to the IEP housing and configured to hold the IEP housing within the body while allowing side-to-side deflection.

2. The IEP housing assembly of claim 1, further comprising a first mounting plate coupled to the bracket via respective ends of the plurality of arms.

3. The IEP housing assembly of claim 2, further comprising a plurality of second biasing members disposed between respective ends of the plurality of arms and the first mounting plate and configured to exert a force on the bracket to hold the IEP housing against the dome assembly.

4. The IEP housing assembly of claim 2, further comprising a second mounting plate coupled to the first mounting plate and configured for mounting a plurality of lamps.

5. The IEP housing assembly of claim 4, wherein the first mounting plate includes an upper ring and a lower ring extending downward and radially outward from the upper ring, and further comprising a plurality of mounting tabs extending radially inward from the upper ring and configured for coupling to the bracket and a plurality of second mounting tabs extending radially outward from the upper ring and configured for coupling to the second mounting plate.

6. The IEP housing assembly of claim 1, wherein the body is annular and the plurality of arms consist of three arms.

7. The IEP housing assembly of claim 1, wherein the bracket and the IEP housing are made of plastic.

8. The IEP housing assembly of claim 1, wherein the IEP housing includes an annular notch having an angled surface at a lower end of the IEP housing.

9. The IEP housing assembly of claim 1, wherein the body includes a plurality of clearance holes and further comprising a plurality of screws extending through the plurality of clearance holes to loosely hold the IEP housing within a central opening of the body.

10. An interferometric endpoint (IEP) housing assembly for endpoint detection of plasma processing, comprising:
    an IEP housing having an upper end configured to interface with a light source and having an internal cavity, wherein a lower end of the IEP housing is configured to interface with a dome assembly of a process chamber;
    a bracket having a body disposed about the IEP housing and having a plurality of arms extending radially outward from the body;
    a plurality of biasing members extending from the body to the IEP housing and configured to hold the IEP housing within the body while allowing side-to-side deflection;
    a first mounting plate coupled to the bracket via respective ends of the plurality of arms; and
    a plurality of second biasing members disposed between the plurality of arms and the first mounting plate and configured to exert a force on the bracket to hold the IEP housing against the dome assembly.

11. The IEP housing assembly of claim 10, wherein each of the plurality of second biasing members are disposed about a fastener extending through a corresponding one of the plurality of arms and into the first mounting plate.

12. The IEP housing assembly of claim 10, wherein the bracket is entirely disposed between an upper surface of the first mounting plate and a lower surface of the first mounting plate.

13. The IEP housing assembly of claim 10, further comprising a lens disposed in a lower end of the IEP housing and a retaining ring coupled to the IEP housing at the lower end to clamp the lens therebetween.

14. The IEP housing assembly of claim 10, wherein the upper end of the IEP housing includes a central opening and a lower end of the IEP housing includes a second central opening concentric with the central opening.

15. A process chamber, comprising:
    a chamber body defining an interior volume therein;
    a dome assembly disposed in the interior volume, wherein the dome assembly includes a dome, a window, and a dome ring configured to clamp the window to the dome; and an upper assembly disposed above the dome, wherein the upper assembly includes:
  an interferometric endpoint (IEP) housing assembly for endpoint detection of plasma processing, comprising:
    an IEP housing having an upper end configured to interface with a light source and having an internal cavity, wherein a lower end of the IEP housing is configured to interface with the dome ring;
    a bracket having a body disposed about the IEP housing and having a plurality of arms extending radially outward from the body; and
    a plurality of biasing members extending from the body to the IEP housing and configured to hold the IEP housing within the body while allowing side-to-side deflection to align the IEP housing with respect to the dome ring.

16. The process chamber of claim 15, further comprising an RF coil disposed between the bracket and the dome, wherein the RF coil includes a first coil and a second coil disposed about the IEP housing.

17. The process chamber of claim 15, wherein the window is aligned with a lens disposed in a lower end of the IEP housing.

18. The process chamber of claim 17, further comprising a lens disposed in a lower end of the IEP housing and a retaining ring coupled to the IEP housing at the lower end to clamp the lens therebetween.

19. The process chamber of claim 15, wherein the upper assembly further comprises a lamp assembly coupled to the IEP housing assembly.

20. The process chamber of claim 15, further comprising:
  a first mounting plate coupled to the bracket via respective ends of the plurality of arms; and
  a plurality of second biasing members disposed between the respective ends of the plurality of arms and the first mounting plate and configured to exert a biasing force on the bracket to align the bracket with respect to the first mounting plate.

* * * * *